United States Patent [19]

Heath

[11] Patent Number: 4,487,387
[45] Date of Patent: Dec. 11, 1984

[54] COMPOSITE PIPE HANGER RING NUT

[75] Inventor: Richard W. Heath, La Habra, Calif.

[73] Assignee: Tolco Incorporated, Brea, Calif.

[21] Appl. No.: 374,179

[22] Filed: May 3, 1982

[51] Int. Cl.³ .............................................. E21F 17/02
[52] U.S. Cl. ........................................ 248/59; 248/62
[58] Field of Search ................... 248/59, 60, 58, 62, 248/63; 411/427, 902, 129, 130

[56] References Cited

U.S. PATENT DOCUMENTS

| 1,698,571 | 1/1929 | Van Cleve | 248/62 |
| 1,929,700 | 10/1933 | Malone | 248/58 X |
| 3,261,580 | 7/1966 | Schauster | 248/62 |
| 3,273,838 | 9/1966 | Fletcher et al. | 248/62 |
| 3,342,082 | 9/1967 | Davidson | 74/553 |
| 4,000,539 | 1/1977 | Neyer | 74/553 |

Primary Examiner—J. Franklin Foss
Attorney, Agent, or Firm—Knobbe, Martens, Olson & Bear

[57] ABSTRACT

The ring nut is a composite of a tubular element made of plastic having an outwardly extending flange on one end with a steel nut embedded in the flange. The tubular element extends through holes in a pipe hanger strap and is strong enough to handle the torque of rotating the element, but it need not be strong enough to support the pipe load in that the steel nut supports this load.

12 Claims, 4 Drawing Figures

U.S. Patent  Dec. 11, 1984  4,487,387
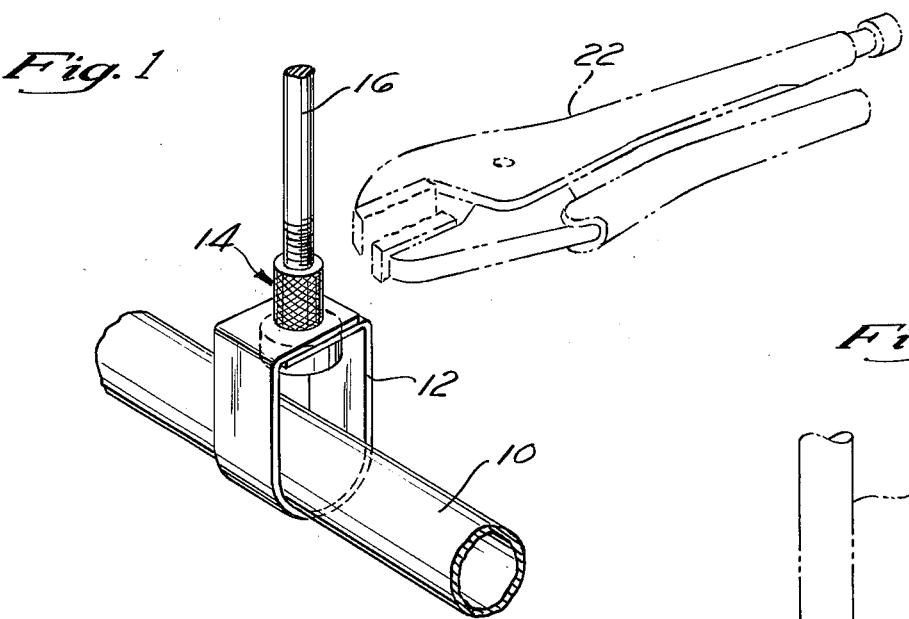
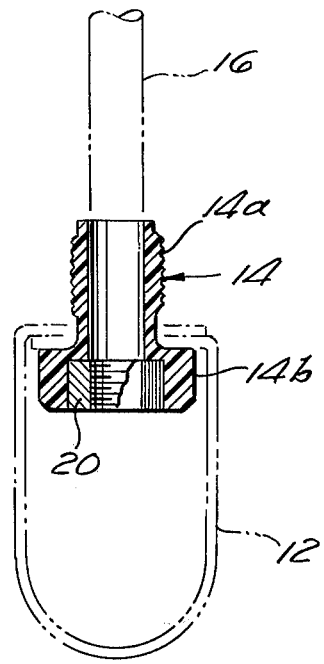
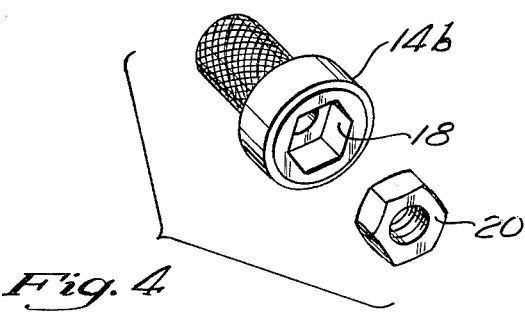
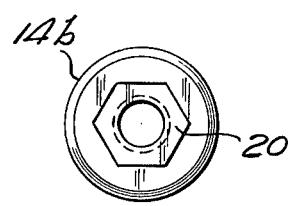

COMPOSITE PIPE HANGER RING NUT

BACKGROUND OF THE INVENTION

This invention relates to an improved adjustable ring nut for supporting pipe hangers.

Pipe hanger assemblies typically include a pipe hanger strap or other such member which surrounds and supports the pipe or other object to be suspended from an overhead support. A pipe hanger rod is connected on its upper end to a ceiling beam or other overhead supporting structure, and the lower end of the rod is connected to the pipe hanger strap. One common way of connecting the lower end of the rod is to use a steel ring nut which has a tubular exterior with an outwardly extending flange at its lower end and has a threaded interior. The upper end of the ring nut extends through holes in the pipe hanger strap but the flange on the lower end is larger than the hole in the strap. Thus, when the nut is threaded onto the lower end of the pipe hanger rod, the flange supports the pipe hanger. It is difficult to have access to the flange for rotating the ring nut in adjusting its position on the support rod. Thus the exterior of the upper tubular portion is usually knurled or otherwise formed to facilitate gripping so that the ring nut can be turned from above the pipe hanger strap.

Ring nuts of the type described above are quite satisfactory from a performance standpoint. However, one drawback is that they are relatively expensive since it is a specially machined component having interior threads. While the individual cost of one ring nut is not great, the huge volumes of the component are utilized, with the result that any cost reductions are important.

A much less expensive approach that is also utilized is to simply insert the pipe hanger rod through the opening in the pipe hanger strap and thread a regular nut onto the lower end of the rod. The exterior dimension of the nut is greater than the hole in the strap so that the load is transmitted directly to the nut. The major shortcoming of this approach is that it is difficult to have access to the nut to rotate it in making the necessary adjustments in the height of the pipe hanger strap.

Accordingly, the need exists for a method of adjustably connecting the pipe hanger strap and the pipe hanger rod in a manner that is as convenient as the currently-used ring nuts but is less expensive.

SUMMARY OF THE INVENTION

Briefly stated, the ring nut of the invention is formed as a composite of two components. A tubular element, preferably made a relatively strong, moldable, plastic-like material, has an outwardly extending flange on its lower end and a mass-produced, inexpensive nut preferably having a hexagonal exterior is positioned in a recess in the end of the flange. The tubular element is preferably molded in place around the nut so that a unitary composite ring nut is obtained.

The advantage of the composite ring nut is that it is much cheaper to fabricate than the all-metal ring nut currently employed. The plastic or other material utilized in the composite nut is sufficiently strong that it can withstand the torque applied when adjusting the nut on the pipe hanger rod. However, it need not be strong enough to support the load applied to the pipe hangers in that the metal nut embedded in the flange of the plastic element carries the load by virtue of its threads cooperating with the threads on the rod and by virtue of the fact that the exterior of the metal nut is larger than the hole through the pipe hanger so that the nut receives the load through a thin layer of flange material on the other element.

DESCRIPTION OF THE DRAWINGS

FIG. 1 is a perspective view of a pipe hanger assembly utilizing the composite ring nut of the invention;

FIG. 2 is a cross-sectional view of the ring nut of the invention with a pipe hanger and pipe hanger support rod shown in phantom lines;

FIG. 3 is an end view of the nut; and

FIG. 4 is an exploded perspective view of the nut.

DETAILED DESCRIPTION OF THE PREFERRED EMBODIMENT

Referring to FIG. 1, a pipe 10 is shown extending through a conventional pipe hanger strap 12. A composite pipe hanger nut 14 extends through holes through overlapping upper ends of the pipe hanger strap, and a pipe hanger rod 16 is connected to the nut.

As seen from FIG. 1 as well as the other figures, the composite ring nut 14 includes an upper tubular portion 14a which extends through the holes in the pipe hanger strap ends and a lower outwardly extending flange 14b which engages the surface of the pipe hanger strap end surrounding the hole through which the tubular portion extends. The flange 14b has a recess formed in its lower axial face in which is positioned a conventional nut 20 having a hexagonal, or other straight-sided exterior which fits snugly within the recess. The straight-sided arrangement or other interconnection is necessary so that rotation of the tubular element will rotate the nut. The nut is preferably made of steel and the tubular element is preferably made of a relatively strong, moldable, plastic-like material. One suitable material is made of polycarbonate and sold under the trademark Lexan by the General Electric Company.

In use, the composite ring nut is positioned through the pipe hanger strap as shown in FIGS. 1 and 2, and the nut 20 is threaded onto the lower end of the pipe hanger rod 16. The exterior of the tubular portion extending through the pipe hanger is preferably knurled as shown, so that it may be conveniently gripped by an appropriate tool 22 and rotated as desired to adjust the elevation of the pipe hanger assembly. The tubular element is sufficiently strong to accommodate such torque in adjusting the nut; but since the threads are formed in the steel nut, the weight of the pipe or other load on the pipe hanger strap is borne by the steel thread on the nut 20 rather than the plastic element.

The plastic element may be separately molded and the nut then pressed into the recess, or the plastic element may be molded around the nut. Either approach provides a reliable composite ring nut which is less expensive than the conventional all-metal ring nuts currently employed.

I claim:

1. A composite pipe hanger nut comprising:
   a tubular element for receiving a pipe hanger rod, an outwardly extending flange formed on one end of the element and a recess formed in the outer axial end of said flange; and
   a nut positioned in said recess having a threaded interior bore for threading into the pipe hanger support rod, the nut threads being sufficiently strong to support a pipe or other such load to be carried by the pipe hanger nut;

said recess and nut having walls which cooperate so that torque applied to the tubular element will rotate the nut on said pipe rod.

2. The composite nut of claim 1, wherein the threaded nut bore is aligned with the rod receiving hole through the tubular element, with the hole being slightly larger than the nut bore.

3. The nut of claim 1, wherein the depth of the recess is about equal to the thickness of the nut.

4. The composite nut of claim 1, wherein the tubular element is made of plastic and the threaded nut is made of metal.

5. The composite nut of claim 1 wherein the threaded nut is made of metal or other strong material sufficient to support the load to be carried by the nut, and the tubular element is made of a material which is sufficiently strong to permit initial adjustment of the composite nut by gripping the tubular portion to rotate the nut and sufficiently strong for a portion of the tubular element to transfer the load to the nut, but it need not be strong enough to support a load to be carried by the pipe hanger.

6. The nut of claim 1 wherein the tubular element is made of suitable plastic or other material which is sufficiently strong and can be molded around the nut.

7. A pipe hanger assembly comprising a pipe support having a lower portion surrounding a pipe and upper, overlapping, horizontally-extending end portions having a hole formed therethrough; a composite ring nut having a tubular portion extending upwardly through the hole in the pipe support and having a lower flange portion which is larger than the hole in the pipe support and hence engages the portion of the pipe support surrounding the hole; a pipe support rod extending into said ring nut and being captured by the ring nut to support the pipe;

the improvement wherein the tubular portion of the ring nut is unthreaded, and a threaded nut is rotationally captured in the flange, the nut in the flange including an internally-threaded bore which threadably receives threads formed on the lower end of the pipe support rod.

8. A pipe hanger assembly comprising:
a pipe hanger comprising a lower portion surrounding a pipe and an upper, overlapping, horizontally extending end portion having a hole formed therethrough;
a composite ring nut comprising:
an unthreaded tubular portion, extending upwardly through the hole in the pipe hanger; and
a lower flange which is larger than the hole in the pipe hanger and engages the portion of the pipe hanger surrounding the hole; and
a threaded captured nut, in said flange having an internally-threaded bore which receives threads formed on the lower end of a pipe support rod, said threaded bore being of sufficient length and strength to support the weight of the pipe and pipe hanger assembly.

9. A method of making a composite ring nut for supporting a pipe hanger, comprising:
forming an elongated tubular element with a radially, outwardly extending flange on one end, said flange being formed with an axially opening recess; and
positioning a threaded nut in said recess in a manner such that rotating said tubular element will rotate the nut, the nut having a threaded bore which is axially aligned with the opening through the tubular element.

10. The method of claim 9 wherein said tubular element is formed in a single operation.

11. The method of claim 10 wherein said tubular element is formed by molding.

12. The method of claim 11 wherein said nut is embedded in said flange during the molding operation.

* * * * *